United States Patent [19]

Inagami et al.

[11] 4,243,774

[45] Jan. 6, 1981

[54] RUBBER COMPOSITION

[75] Inventors: Masaaki Inagami, Kamakura; Hiroshi Fukushima, Zushi, both of Japan

[73] Assignee: Nippon Zeon Co. Ltd., Tokyo, Japan

[21] Appl. No.: 28,818

[22] Filed: Apr. 10, 1979

[30] Foreign Application Priority Data

Apr. 13, 1978 [JP] Japan .................................. 53-43464

[51] Int. Cl.$^3$ ....................... C08L 61/10; C08L 71/02
[52] U.S. Cl. .................................................. 525/405
[58] Field of Search ................ 525/134, 405; 528/421, 528/130

[56] References Cited

U.S. PATENT DOCUMENTS 3,787,376   1/1974   Nakamura ............................ 260/79
4,032,479   6/1977   Bunnomori et al. ................ 528/421

*Primary Examiner*—Theodore E. Pertilla
*Attorney, Agent, or Firm*—Sherman & Shalloway

[57] ABSTRACT

A rubber composition capable of giving a vulcanizate having superior adhesiveness, comprising 100 parts by weight of an unsaturated epoxide-copolymerized epichlorohydrin-type rubber, 0.1 to 5 parts by weight of a di- or tri-mercapto-s-triazine, 1 to 20 parts by weight of a phenolic resin, and 5 to 50 parts by weight of finely divided silicic acid or its salt.

8 Claims, No Drawings

RUBBER COMPOSITION

This invention relates to a rubber composition which gives a vulcanizate having good adhesion especially to various fibers such as natural fibers, regenerated cellulose fibers, synthetic fibers and inorganic fibers. More specifically, this invention pertains to a rubber composition comprising an unsaturated epoxide-copolymerized epichlorohydrin-type rubber, a di- or tri-mercapto-s-triazine, a phenolic resin, and finely divided silicic acid or its salt.

Generally, rubber products such as belts, hoses or tires are reinforced with fibers such as cotton, rayon, polyvinyl acetal, polyamide or polyester fibers or glass fibers. However, since the adhesion of vulcanized synthetic rubbers to these fibers is difficult, it is the usual practice to treat the fibers prior to use with such a material as (1) a solution of the same quality of polymeric rubber as the adhered rubber in an organic solvent, (2) a solution prepared by adding a diisocyan, etc. to the solution (1), or (3) a mixture of a resorcinol-formaldehyde precondensate and a rubber latex such as a natural rubber latex, SBR latex, vinyl pyridine copolymer latex, carboxylic acid-modified latex or a polychloroprene-type latex.

An epichlorohydrin rubber (to be referred to as CHR) or an epichlorohydrin-ethylene oxide copolymer rubber (to be referred to as CHC) have recently gained a markedly increased demand as automotive parts and various industrial hoses and belts because of their superior oil resistance, thermal stability, low temperature resistance, chemical resistance and weatherability. However, the CHR and CHC rubbers have the defect that they do not easily adhere to fibers treated by the methods described above.

It is an object of this invention therefore to provide an epichlorohydrin-type synthetic rubber composition capable of giving a vulcanizate which can adhere easily to various fibers pretreated by known methods.

We have now found that a rubber composition comprising an unsaturated epoxide-copolymerized epichlorohydrin-type synthetic rubber as a rubber component, a di- or tri-mercapto-s-triazine as a vulcanizer ingredient, and a phenolic resin and finely divided silicic acid or its salt as additive ingredients gives a vulcanizate which has superior adhesion without sacrificing the various properties of the conventional CHR or CHC.

According to this invention, there is provided a rubber composition comprising 100 parts by weight of an unsaturated epoxide-copolymerized epichlorohydrin-type rubber, 0.1 to 5 parts by weight of a di- or tri-mercapto-s-triazine, 1 to 20 parts by weight of a phenolic resin and 5 to 50 parts by weight of finely divided silicic acid or its salt.

The unsaturated epoxide-copolymerized epichlorohydrin-type rubber that can be used in this invention is usually a copolymer rubber composed of 25 to 97 mole%, preferably 50 to 95 mole%, of epichlorohydrin, 0 to 60 mole%, preferably 0 to 40 mole%, of ethylene oxide and 3 to 15 mole%, preferably 5 to 10 mole%, of an unsaturated epoxide and preferably having a Mooney viscosity ($ML_{1+4}$ at 100° C.) of 10 to 150. Examples of the unsaturated epoxide are allyl glycidyl ether, glycidyl methacrylate, glycidyl acrylate and butadiene monoxide. When the amount of the unsaturated epoxide copolymerized is less than 3 mole%, the adhesion of the rubber is not improved. When it exceeds 15 mole%, the thermal stability of the rubber is degraded. The proportion of the ethylene oxide to be copolymerized is selected according to the low temperature resistance required of the final product. However, when the proportion of ethylene oxide to be copolymerized exceeds 60 mole%, the oil resistance and water resistance of the rubber are degraded to such an extent as to be unsuitable for practical application.

So far as a substantial improvement in resistance can be achieved, the conventional CHR or CHC can be mixed with the unsaturated epoxide-copolymerized epichlorohydrin rubber of this invention.

Among known vulcanizers for epichlorohydrin rubber, only di- or tri-mercapto-s-triazines are are useful in the present invention. Examples of the di- or tri-mercapto-s-triazines are 2-anilino-4,6-dimercapto-s-triazine, 2-(N,N-dibutylamino)-4,6-dimercapto-s-triazine and 2,4,6-tri-mercapto-s-triazine and sodium salts of these. In view of storage stability and processing stability, 2,4,6-trimercapto-s-triazine is most preferred. The amount of the vulcanizer is 0.1 to 5 parts by weight, preferably 0.5 to 2 parts by weight, per 100 parts by weight of the unsaturated epoxide-copolymerized epichlorohydrin rubber.

The phenolic resin used in this invention contains at least one structural unit of the formula

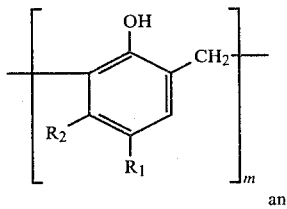

and

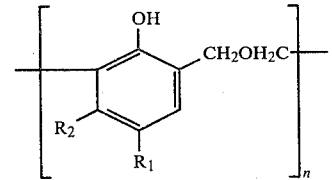

wherein $R_1$ and $R_2$ independently from each other represent a hydrogen atom or a lower alkyl group such as methyl or tertiary butyl; and each of m and n is 0 or an integer of 1 to 10 with the proviso that m plus n is an integer of 2 to 10 and m and n are not zero at the same time. It includes, for example, products obtained by the condensation reaction of phenol compounds such as phenol, alkylphenols (e.g., cresol or xylenol), phenylphenol or resorcinol with aldehyde compounds such as formaldehyde or paraformaldehyde, modification products thereof with terpene, cashew, etc., and cocondensates between the phenol compounds and amine compounds such as aniline and melamine.

When the amount of the phenolic resin is less than 1.0 part by weight per 100 parts by weight of the rubber, the effect of increasing the adhesion strength is reduced, and if it is larger than 20 parts by weight, the kneading and processing characteristics of the rubber are deteriorated markedly. The preferred amount of the phenolic resin for practical purposes is 3 to 15 parts by weight per 100 parts by weight of the rubber.

The finely divided silicic acid or its salt used in this invention may be silicic anhydride, hydrous silicic acid and its salts. These compounds are readily available as a rubber filler. When the amount of the finely divided silicic acid and its salt is less than 5 parts by weight per 100 parts by weight of the rubber, the effect of increasing the adhesion strength is reduced. If it is larger than 50 parts by weight, the kneading and processing characteristics of the rubber composition are markedly degraded. The preferred amount of such a compound for practical application is 10 to 30 parts by weight per 100 parts by weight of the rubber.

The rubber composition of this invention is prepared by mixing the aforesaid ingredients optionally together with ordinary rubber compounding agents such as reinforcing agents, fillers, plasticizers, antioxidants, vulcanization aids and valcanization accelerators by an ordinary mixing machine such as a roll or Banbury mixer.

When a coupling agent such as an organic silicone compound or an organic titanate compound is used as an activator, a favorable effect can be obtained for the increase of adhesion strength. The amount of the coupling agent is 0.5 to 5 parts by weight, preferably 1 to 3 parts by weight, per 100 parts by weight of the rubber. Examples of the organic silicone compound include γ-mercaptopropyl trimethoxysilane, γ-aminopropyl triethoxysilane, γ-glycidoxypropyl trimethoxysilane, vinyltriethoxysilane, vinyltris(β-methoxy ethoxy)silane, γ-methacryloxypropyl trimethoxysilane, N-β(aminoethyl)-γ-aminopropyl methyl dimethoxysilane and N-β(aminoethyl)-γ-aminopropyl trimethoxysilane. Examples of the organic titanate compounds include tetraalkyl orthotitanates with the alkyl being methyl, ethyl, n-propyl, isopropyl, n-butyl or isobutyl, butyl polytitanate, cresyl titanate, 2-ethylhexyl titanate, nonyl titanate, cetyl titanate, stearyl titanate, diisopropoxy-bis(2,4-pentadionate)titanium, diisopropyl ditriethanol aminotitanate, isopropylhexylene glycol titanate and tributyl oleyl ortho-titanate.

By covering fibers pre-treated by the usual methods described hereinabove with the rubber composition of this invention and vulcanizing the assembly, a composite of valcanized rubber and the fibers is obtained. This composite is very useful since a hitherto-unobtainable high adhesion strength is obtained between the vulcanized rubber and the fibers.

The following Examples illustrate the present invention specifically. The parts indicating the amounts of rubbers and compounding agents are by weight.

REFERENTIAL EXAMPLE (Production of pre-treated fiber cords)

Water (238.4 gr), 11.0 gr of resorcinol, 16.0 gr of 37% formalin and 0.3 gr of sodium hydroxide were mixed, and aged at 25° C. for 6 hours to form a resin solution. Then, 260.0 gr of the resin solution was mixed with 239.0 gr of a vinylpyridine copolymerized SBR latex (Nipol 2518 FS, a product of Nippon Zeon Co., Ltd.) and 600 gr of water (the pH of the mixture was 7.3), and aged at 25° C. for 6 hours to form an adhesive composition.

Nylon-6 cords (840 d/2×4), polyester cords (obtained by dipping 1000 d/2×5 polyester cords in a 5% toluene solution of tolylene diisocyanate, and heating it at 200° C. for 5 minutes under 5% stretch), or glass fiber cords (obtained by dipping glass fibers of the structure ECG 150 (3/10) 2.0 S set forth in JIS R-3413 (1963) in a 5% aqueous dispersion of γ-aminopropyl triethoxysilane, and heat-treating it at 200° C. for 3 minutes), and then heat-treating it at 155° C. for 5 minutes to produce pre-treated fibrous cords for adhesion to rubber.

EXAMPLE 1

Rubber compositions were prepared by means of cold rolls in accordance with the compounding recipes shown in Table 1, and the pre-treated fibrous cords obtained in the Referential Example were press-bonded to each of the rubber compositions. The assembly was vulcanized under pressure at 160° C. for 45 minutes to bond them to each other, and its adhesion strength was measured by the H-test method set forth in ASTM D-2138 (1972). The results are shown in Table 1.

TABLE 1

| Run No. | Comparison | | Invention | |
|---|---|---|---|---|
| Rubber and compounding ingredients | 1 | 2 | 3 | 4 |
| Epichlorohydrin-type rubber | 100 | 100 | 100 | 100 |
| Epichlorohydrin (moles) | (100) | (50) | (90) | (50) |
| Ethylene oxide (moles) | (0) | (50) | (0) | (40) |
| Allyl glycidyl ether (moles) | (0) | (0) | (10) | (10) |
| Stearic acid | 1 | 1 | 1 | 1 |
| N-770 carbon black | 30 | 30 | 30 | 30 |
| Hydrous silicic acid (*1) | 10 | 10 | 10 | 10 |
| Resol-type phenolic resin (*2) | 5 | 5 | 5 | 5 |
| Nickel dibutyldithiocarbamate | 1 | 1 | 1 | 1 |
| Aminosilane coupling agent (*3) | 2 | 2 | 2 | 2 |
| Magnesium oxide | 3 | 3 | 3 | 3 |
| Calcium carbonate | 10 | 10 | 10 | 10 |
| 2,4,6-Trimercapto-s-triazine | 1.2 | 1.2 | 1.2 | 1.2 |
| 1,3-Diphenylguanidine | 0.2 | 0.2 | 0.2 | 0.2 |
| H-test adhesion strength (kg/piece) | | | | |
| Nylon cords | 9.5 | 7.3 | 18.7 | 15.3 |
| Polyester cords | 7.4 | 5.1 | 15.8 | 12.4 |
| Glass fiber cords | 6.7 | 5.0 | 14.2 | 12.0 |

(1*): Nipsil VN-3, a trademark for a product of Nippon Silica Co., Ltd.
(2*): Cohedur RL, a trademark for a product of Bayer AG.
(3*): A-1120, a trademark for a product of Union Carbide Corporation.

It is seen from Table 1 that the allyl glycidyl ether-copolymerized epichlorohydrin-type rubber composition of this invention gives a vulcanizate having a much higher adhesion strength than the conventional CHR or CHC composition.

EXAMPLE 2

Example 1 was repeated except that an epichlorohydrin-type rubber having the composition shown in Table 2 was used. The results of the same H-test as in Example 1 are shown in Table 2. The same samples as used in the H-test were subjected to an aging test by allowing each sample to stand in hot air at 150° C. for 240 hours, and subjecting it to a 180-degree bending test to examine the occurrence of cracks.

TABLE 2

| Run No. | Comparison | Invention | | Comparison |
|---|---|---|---|---|
| | 1 | 2 | 3 | 4 |
| Epichlorohydrin-type rubber composition (moles) | | | | |
| Epichlorohydrin | 50 | 50 | 50 | 50 |
| Ethylene oxide | 49 | 47 | 35 | 30 |
| Allyl glycidyl ether | 1 | 3 | 15 | 20 |
| H-test adhesion strength (kg/piece) | | | | |
| Nylon cords | 8.0 | 14.3 | 19.3 | 20.5 |
| Polyester cords | 6.5 | 10.2 | 16.4 | 17.3 |
| Glass fiber cords | 6.9 | 10.0 | 15.9 | 16.8 |
| Aging test (the occurrence of cracks | No | No | No | Yes (broken) |

It is seen from Table 2 that when the proportion of allyl glycidyl ether copolymerized is 1 mole%, the adhesion strength of the vulcanized rubber composition is low, and when it is 20 mole%, the adhesion strength is good, but hardening due to heat degradation is noted.

EXAMPLE 3

Example 1 was repeated except that a ternary copolymer rubber composed of 70 mole% of epichlorohydrin, 20 mole% of ethylene oxide and 10 mole% of allyl glycidyl ether was used as the epichlorohydrin-type rubber was used in accordance with the compounding recipes shown in Table 3. The results are shown in Table 3.

EXAMPLE 4

Example 1 was repeated except using a rubber composition composed of 100 parts of the same epichlorohydrin rubber as used in Example 3, 1 part of stearic acid, 30 parts of N-770 carbon black, 10 parts of the same hydrous silicic acid as in Table 1, each of the resins shown in Table 4 in the amounts indicated, 1 part of nickel dibutyldithiocarbamate, 2 parts of the same aminosilane coupling agent as in Table 1, 1.2 parts of 2,4,6-trimercapto-s-triazine, 3 parts of magnesium oxide and 5 parts of calcium carbonate. The results are shown in Table 4.

TABLE 4

|  | Run No. | Resin added | | H-test adhesion strength (kg/piece) | | |
|---|---|---|---|---|---|---|
|  |  | Resin | Parts | Nylon cords | Polyester cords | Glass fiber cords |
| Comparison | 1 | Resol-type phenolic resin (*2) | 0.5 | 8.0 | 6.2 | 5.8 |
| Invention | 2 | Resol-type phenolic resin (*2) | 1.0 | 12.5 | 10.7 | 10.3 |
|  | 3 | Resol-type phenolic resin (*2) | 20 | 19.2 | 18.4 | 17.6 |
| Comparison | 4 | Resol-type phenolic resin (*2) | 25 | 18.8 | 17.3 | 15.1 |
|  | 5 | Novolak-type phenolic resin (*4) | 5 | 14.7 | 14.0 | 13.8 |
| Invention | 6 | Resol-type thermosetting alkylphenol resin (*5) | 5 | 16.2 | 14.5 | 13.0 |
|  | 7 | Cashew-modified phenolic resin (*6) | 5 | 13.1 | 11.6 | 10.7 |
| Comparison | 8 | Terpene resin (*7) | 5 | 7.9 | 7.5 | 6.8 |
|  | 9 | Coumarone-indene resin (*8) | 5 | 8.1 | 6.9 | 6.3 |

(*2): The same as the footnote to TABLE 1.
(*4): PR-317, a trademark for a product of Sumitomo Durez Co., Ltd.
(*5): AP-107D, a trademark for a product of Gunei Chemical Co., Ltd.
(*6): PR-12987, a trademark for a product of Sumitomo Durez Co., Ltd.
(*7): ST-5070, a trademark for a product of Schenectady Chem.
(*8): Coumarone CL, a trademark for a product of Ouchi Shinko Sha.

Table 3.

TABLE 3

| Run No. | Comparison | | | | Invention | | | Comparison | |
|---|---|---|---|---|---|---|---|---|---|
| Rubber and compounding ingredients | 1 | 2 | 3 | 4 | 5 | 6 | 7 | 8 | 9 |
| Epichlorohydrin-type rubber | 100 | 100 | 100 | 100 | 100 | 100 | 100 | 100 | 100 |
| Stearic acid | 1 | 1 | 1 | 1 | 1 | 1 | 1 | 1 | 1 |
| N-770 carbon black | 30 | 30 | 30 | 30 | 30 | 30 | 30 | 30 | 30 |
| Anhydrous silicic acid (*1) | 10 | 10 | 10 | 10 | 10 | 10 | 10 | — | 10 |
| Resol-type phenolic resin (*2) | 5 | 5 | 5 | 5 | 5 | 5 | 5 | 5 | — |
| Nickel dibutyldithiocarbamate | 1 | 1 | 1 | 1 | 1 | 1 | 1 | 1 | 1 |
| Aminosilane coupling agent (*3) | 2 | 2 | 2 | 2 | 2 | 2 | 2 | 2 | 2 |
| 2-Mercaptoimidazoline | 1.5 | 1.5 | — | — | — | — | — | — | — |
| Hexamethylenediamine carbamate | — | — | 1.0 | — | — | — | — | — | — |
| Trimethylthiourea | — | — | — | 1.5 | — | — | — | — | — |
| 2,4,6-Trimercapto-s-triazine | — | — | — | — | 1.2 | — | — | 1.2 | 1.2 |
| 2-Anilino-4,6-dimercapto-s-triazine | — | — | — | — | — | 1.0 | — | — | — |
| 2-(N,N-dibutylamino)-4,6-dimercapto-s-triazine | — | — | — | — | — | — | 1.0 | — | — |
| Red lead | 5 | — | 5 | 5 | — | — | — | — | — |
| Magnesium oxide | — | 5 | — | — | 5 | 5 | 5 | 5 | 5 |
| H-test adhesion strength (kg/piece) | | | | | | | | | |
| Nylon cords | 8.8 | 8.4 | 7.7 | 7.0 | 17.2 | 18.9 | 14.7 | 9.4 | 8.1 |
| Polyester cords | 6.9 | 6.2 | 5.9 | 6.2 | 14.4 | 16.5 | 11.2 | 7.7 | 5.9 |
| Glass fiber cords | 6.5 | 6.0 | 4.3 | 4.9 | 13.0 | 15.4 | 10.9 | 6.9 | 5.4 |

(*1), (*2) and (*3): The same as the footnote to TABLE 1.

It is seen from Table 3 that when the di- or tri-mercapto-s-triazine is used as a vulcanizing agent, a marked adhesion strength can be obtained, but with other vulcanizers, the adhesion strength is poor. It is also seen that even when the 2,4,6-trimercapto-s-triazine is used as a vulcanizer, the absence of silicic acid or phenolic resin results in marked reduction in adhesion strength.

It is seen from Table 4 that the adhesion strength of the vulcanized rubber composition is poor when the amount of the resol-type phenolic resin is less than 1 part and when resins other than the phenolic resin are added. The addition of more than 20 parts of the resol-type phenolic resin gives a good adhesion strength, but is not preferred because the composition becomes tacky and reduces processability.

EXAMPLE 5

Example 1 was repeated except using a rubber composition composed of 100 parts of the same epichlorohydrin-type rubber used in Example 3, 1 part of stearic acid, 30 parts of N-770 carbon black, 8 parts of the same resol-type phenolic resin as used in Table 1, each of the white fillers shown in Table 5 in the amounts indicated, 1 part of nickel dibutyldithiocarbamate, 2 parts of the same aminosilane coupling agent as shown in Table 1, 1.2 parts of 2,4,6-trimercapto-s-triazine and 5 parts of magnesium oxide. The results are shown in Table 5.

TABLE 5

| | Run No. | Additional fillers Fillers | Parts | H-test adhesion strength (kg/piece) Nylon cords | Polyester cords | Glass fiber cords |
|---|---|---|---|---|---|---|
| Comparison | 1 | Anhydrous silicic acid (*1) | 3.0 | 7.9 | 6.5 | 6.0 |
| Invention | 2 | " | 5.0 | 12.6 | 11.3 | 10.9 |
| Comparison | 3 | " | 60 | 17.2 | 15.6 | 14.2 |
| | 4 | Silicic anhydride (*9) | 10 | 22.5 | 19.7 | 18.6 |
| Invention | | | | | | |
| | 5 | Hydrous silicic acid (*10) | 10 | 18.4 | 16.2 | 17.0 |
| | 6 | Calcium carbonate (*11) | 15 | 7.5 | 5.9 | 5.2 |
| Comparison | 7 | Clay (*12) | 15 | 8.1 | 6.2 | 5.8 |
| | 8 | Talc (*13) | 15 | 8.5 | 7.3 | 6.6 |

(*1): The same as the footnote to TABLE 1.
(*9): Cab-O-Sil, a trademark for a product of Cabot Company.
(*10): Carplex #67, a trademark for a product of Shionogi Pharmaceutical Co., Ltd.
(*11): Whiton SB, a trademark for a product of Shiraishi Calcium Co., Ltd.
(*12): Hard Top Clay, a trademark for a product of Shiraishi Calcium Co., Ltd.
(*13): Talc SH, a trademark for a product of Shiraishi Calcium Co., Ltd.

It is seen from Table 5 that when the amount of silicic acid is less than 5 parts and when fillers other than silicic acid are used, the adhesion strength of the vulcanized rubber composition is poor. The use of more than 50 parts of silicic acid gives a good adhesion strength, but is not preferred because the composition becomes extremely tacky and its processability is reduced.

What we claim is:

1. A rubber composition capable of giving a vulcanizate having superior adhesiveness, comprising 100 parts by weight of an unsaturated epoxide-copolymerized epichlorohydrin-type rubber, which is a copolymer rubber composed of 25 to 97 mole% of epichlorohydrin, 0 to 60 mole% of ethylene oxide and 3 to 15 mole% of an unsaturated epoxide 0.1 to 5 parts by weight of a di- or tri-mercapto-s-triazine, 1 to 20 parts by weight of a phenolic resin, and 5 to 50 parts by weight of a finely divided silicic acid or its salt.

2. The composition of claim 1 wherein the unsaturated epoxide is selected from the group consisting of allyl glycidyl ether, glycidyl methacrylate, glycidyl acrylate and butadiene monoxide.

3. The composition of claim 1 wherein the phenolic resin contains at least one structural unit expressed by the formula

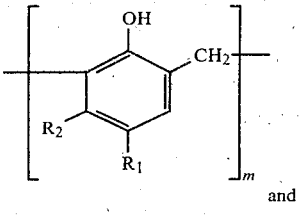

and

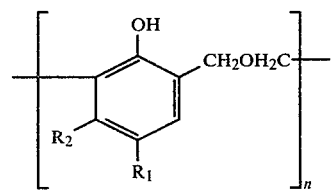

wherein $R_1$ and $R_2$, independently from each other, represent a hydrogen atom or a lower alkyl group, and each of m and n is 0 or an integer of 1 to 10 with the proviso that m plus n is an integer of 2 to 10 and m and n are not zero at the same time.

4. The composition of claim 1 wherein the unsaturated epoxide-copolymerized epichlorohydrin-type rubber is a copolymer composed of 50 to 95 mole% of epichlorohydrin, 0 to 40 mole% of ethylene oxide and 5 to 10 mole% of an unsaturated epoxide.

5. The composition of claim 4 wherein the unsaturated epoxide is selected from the group consisting of allyl glycidyl ether, glycidyl methacrylate, glycidyl acrylate and butadiene monoxide.

6. The composition of claim 1 wherein the di- or tri-mercapto-s-triazine comprises from 0.5 to 2 parts by weight of the composition per 100 parts by weight of the unsaturated epoxide-copolymerized epichlorohydrin-type rubber and is selected from the group consisting of 2-anilino-4,6-dimercapto-s-triazine, 2-(N,N-dibutylamino)-4,6-dimercapto-s-triazine and 2,4,6-tri-mercapto-s-triazine or the sodium salts thereof.

7. The composition of claim 6 wherein the di- or tri-mercapto-s-triazine is 2,4,6-tri-mercapto-s-triazine.

8. The composition of claim 1 comprising 100 parts by weight of the unsaturated epoxide-copolymerized epichlorohydrin-type rubber, 0.5 to 2 parts by weight of 2,4,6-tri-mercapto-s-triazine, 3 to 15 parts by weight of the phenolic resin and 10 to 30 parts by weight of the finely divided silicic acid or its salt.

* * * * *